United States Patent

[11] 3,623,552

| [72] | Inventor | Juris Vairogs<br>Tulsa, Okla. |
|---|---|---|
| [21] | Appl. No. | 876,548 |
| [22] | Filed | Nov. 13, 1969 |
| [45] | Patented | Nov. 30, 1971 |
| [73] | Assignee | Cities Service Oil Company |

[54] RECOVERY OF OIL BY LOW-PRESSURE MISCIBLE GAS INJECTION
6 Claims, 2 Drawing Figs.

[52] U.S. Cl. .................................... 166/274, 166/268
[51] Int. Cl. ..................................... E21b 43/22
[50] Field of Search ........................... 166/268, 273–275

[56] References Cited
UNITED STATES PATENTS

| 2,623,596 | 12/1952 | Whorton et al. | 166/274 |
| 3,003,554 | 10/1961 | Craig et al. | 166/274 |
| 3,065,790 | 11/1962 | Holm | 166/274 |
| 3,084,743 | 4/1963 | West et al. | 166/274 X |
| 3,157,230 | 11/1964 | Connally et al. | 166/274 X |
| 3,256,933 | 6/1966 | Murphree et al. | 166/274 X |
| 3,354,953 | 11/1967 | Morse | 166/274 X |

FOREIGN PATENTS

| 825,475 | 10/1969 | Canada | 166/273 |

Primary Examiner—Ian A. Calvert
Attorney—J. Richard Geaman

ABSTRACT: An oil miscible gas such as carbon dioxide is injected into a subterranean oil reservoir to maintain a reservoir pressure near the critical pressure of the gas. Under predetermined conditions of temperature and pressure the miscible gas-crude oil mixture exhibits a three-phase vapor-liquid phenomena which enhances the recovery of oil from the subterranean reservoir. A miscible gas-rich liquid phase is formed between the oil-rich liquid phase and miscible gas-rich vapor phase and exhibits a density and viscosity intermediate between that of the oil and gas regions. This phenomenon creates a unique fluid distribution and mobility relationship which provides for a significant increase in the efficiency of the displacement of the oil from the gas-swept reservoir.

JURIS VAIROGS
INVENTOR.

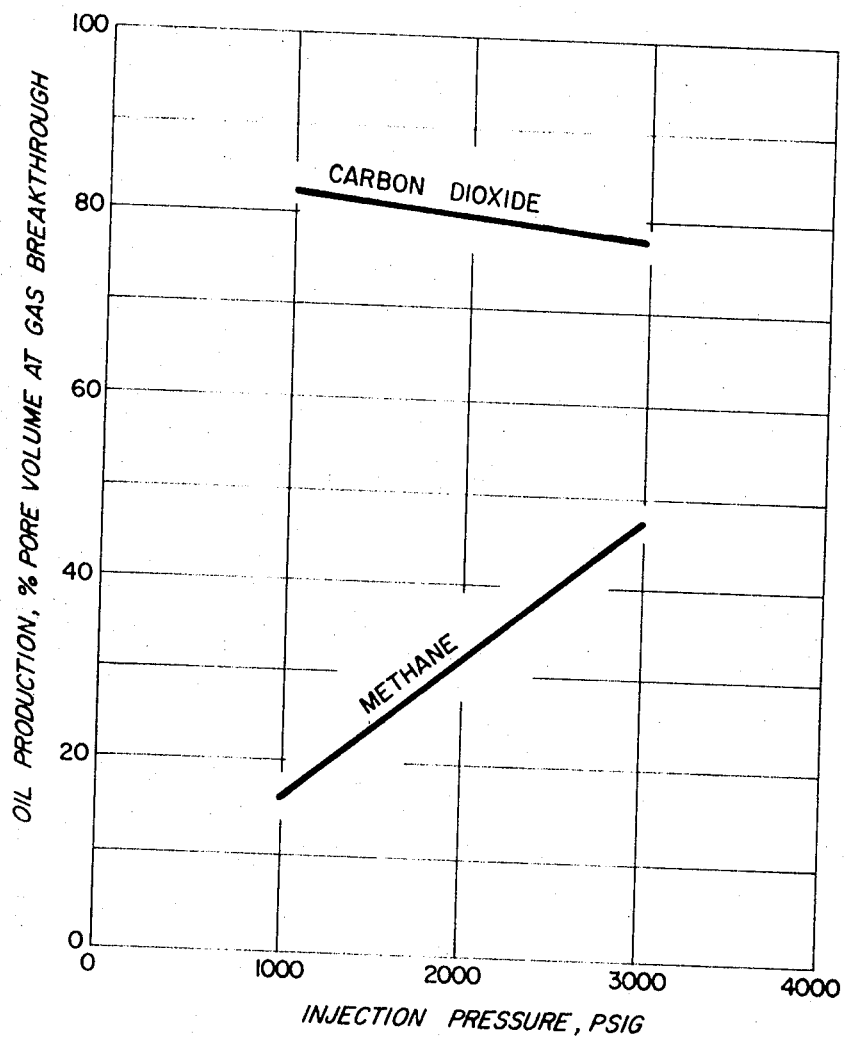

RECOVERY OF OIL BY LOW-PRESSURE MISCIBLE GAS INJECTION

BACKGROUND OF THE INVENTION

This invention relates to the recovery of oil from subterranean reservoirs. More particularly it relates to the secondary recovery of oil from subterranean reservoirs by the introduction of an oil miscible gas near its critical pressure and the resultant formation of a three-phase equilibrium between the miscible gas and reservoir crude oil, forming an intermediate liquid phase which is miscible gas-rich, segregating the oil-rich liquid phase and gas-rich vapor phase which respectively segregate the oil and gas regions of the reservoir.

The application of miscible gases, for example carbon dioxide, for the secondary recovery of oil is well known in the art of reservoir mechanics. Whorton et al., U.S. Pat. No. 2,623,596 describes a method of oil production wherein carbon dioxide at pressures in excess of 1,000 p.s.i. is injected into and passed through an oil reservoir so as to contact the residual oil and drive it to the production wells. Whorton et al. also discloses the introduction of a slug of carbon dioxide followed discloses driven by an injected inert fluid which causes the slug of carbon dioxide to pass through the reservoir in contact with the oil contained therein, and subsequently removing to the earth's surface the oil swept from the reservoir.

The inherent difficulties experienced in any miscible gas displacement process are the extreme mobility ratios and fluid segregation problems which must be overcome. Crude oil having a viscosity in excess of 5.0 centipoise is driven by a gas or fluid exhibiting a viscosity generally less than 1.0 centipoise. This phenomenon results in the formation of viscous "fingers" or outgrowths from the principal slug or bank of miscible material. Premature breakthrough of driving fluid into the production wells is experienced. Channels of less viscous material are formed within the reservoir matrix through which the majority of the remaining driving fluid will pass. The extreme density variance between the crude oil and driving fluid also adds to this undesirable result.

Weinaug et al., U.S. Pat. No. 2,867,277 describes a process whereby oil is recovered by the injection of a petroleum miscible material into the oil reservoir. The specific problem of the development of viscous fingers, which occur when there exists a sharp viscosity difference between the displacing material and the crude oil, is suppressed by the creation of a transition zone or buffer region of intermediate viscosity miscible material between the oil to be displaced and the displacing material. This intermediate region is formed by the injection of a mixture of the displacing material and crude oil ahead of the principle driving fluid to provide a zone of intermediate viscosity fluid between the oil in the reservoir to be displaced and the miscible and less viscous displacing fluid. This intermediate fluid is not self-generating and therefore is dissipated as the zone is driven through the reservoir. Viscous fingering is retarded but not entirely abated as fingers of miscible gas will eventually break through the depleted intermediate zone and channel to the production wellbore.

Numerous other patents disclose the injection of miscible gases for the improved recovery of oil but none explicitly define the method by which the adverse effects of the viscosities of the driven and driving fluids may be overcome. It is essential in the utilization of miscible gases for the displacement of crude oil to prevent or control the phenomena of viscous fingering of the displacing fluid.

It is an object of this invention to provide an improved method for the miscible displacement of oil from subterranean reservoirs.

It is another object of this invention to provide for the prevention or reduction of viscous fingering during the miscible displacement of oil from subterranean reservoirs.

It is still another object of this invention to provide for the formation of a self-generating intermediate viscosity and density buffer zone between the driven and driving fluids during the miscible displacement of oil from subterranean reservoirs.

It is still a further object of the present invention to utilize the unique phase behavior of miscible fluids to overcome the phenomenon of viscous fingering during the miscible displacement of oil from subterranean reservoirs.

With these and other objects in mind, the present invention is hereinafter set forth with reference to the following description and drawings.

SUMMARY OF THE INVENTION

The objects of the present invention are accomplished by a miscible displacement process for the recovery of oil, of the type wherein, miscible gas is introduced into a subterranean oil reservoir under pressure so as to form a bank of gas which dissolves in and renders mobile the oil contained therein and drives the contacted oil to a point where it is removed to the earth's surface, the improvement which comprises introducing the miscible gas at the conditions of pressure and temperature so that a three-phase equilibrium is formed between the miscible gas and the reservoir fluid, comprising a vapor phase rich in the miscible gas being formed at the furthest extent of the leading front of the bank of miscible gas injected, a second phase being a liquid phase rich in the miscible gas and exhibiting a density and viscosity intermediate to the two other phases and formed therebetween, and a third phase being a liquid phase rich in the components of the reservoir fluid and in contact therewith so that as further miscible gas is introduced into the reservoir the three-phase region moves through the reservoir thereby contacting virgin oil, dissolving therein, lowering its viscosity and rendering it more mobile. Viscous fingering of the miscible gas-rich vapor region is inhibited by the stabilization effect of the intermediate miscible gas-rich liquid zone. Uniform frontal displacement is achieved and a greater areal portion of the reservoir is contacted.

BRIEF DESCRIPTION OF THE DRAWINGS

The present invention is hereinafter described in further detail with particular reference to the accompanying drawings in which:

FIG. 2 represents a comparison between a typical miscible gas displacement process and the improved miscible displacement process of the present invention.

DETAILED DESCRIPTION OF THE INVENTION

Figure 1:
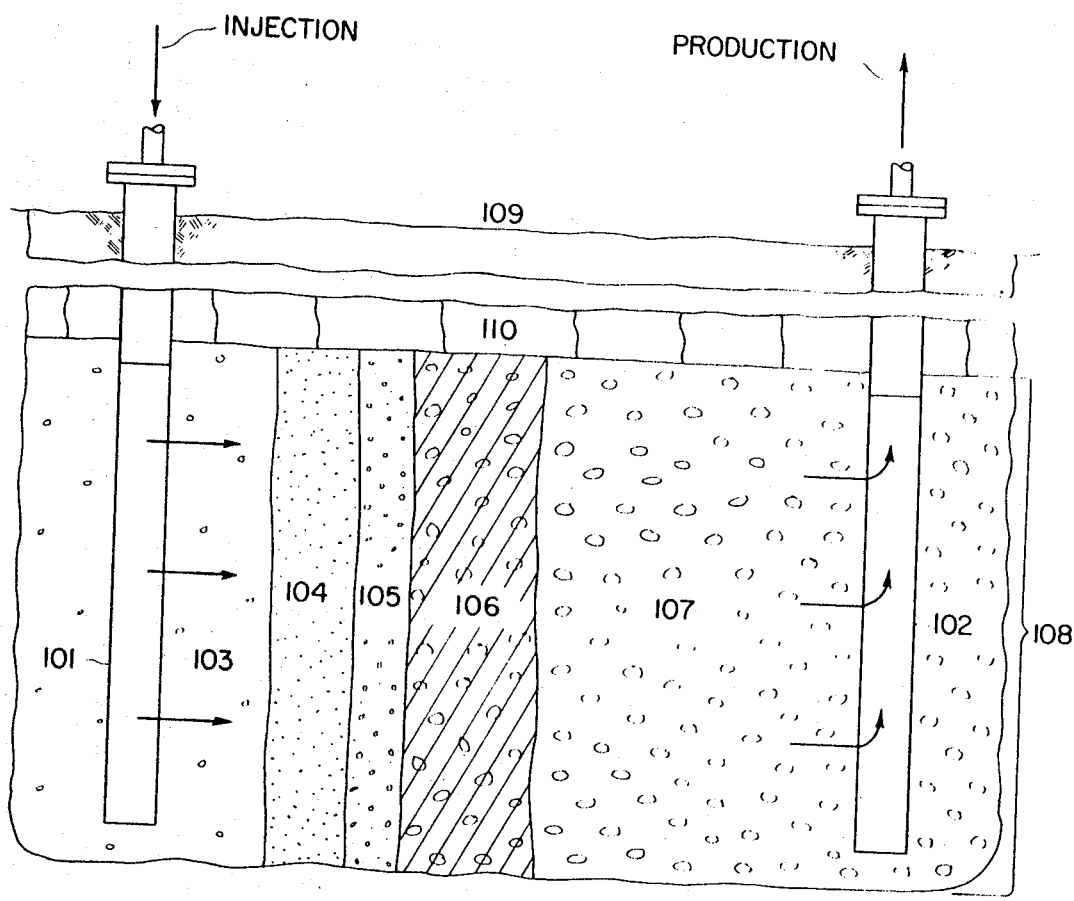
FIG. 1 represents a cross-sectional view of a subterranean oil reservoir with the improved miscible displacement process depicted therein.

I have found the present invention to be particularly applicable through the use of carbon dioxide as the miscible drive gas. Experimental studies have shown the process at normal reservoir temperature and pressures to be most applicable to crude oils which are highly composed of intermediate hydrocarbons. Intermediate hydrocarbons are meant to be those hydrocarbon compounds having from three to eight carbon atoms. A crude oil of significantly high intermediate hydrocarbon composition would exhibit in excess of 25 mol percent of these compounds. Although the three-phase phenomena is exhibited with most crude oils it is particularly predominant with these high-content intermediate hydrocarbon petroleum samples.

One embodiment of the present invention may be illustrated by referral to FIG. 1. Surface 109 and overburdened rock 110 are penetrated by injection well 101 through which the miscible gas is injected into reservoir 108. At explicit conditions of temperature and pressure the miscible gas bank 103 forms a three-phase equilibrium system in contact with reservoir oil 107. Miscible gas-rich vapor phase 104 is in direct contact with the miscible gas bank 103. The intermediate or buffer zone 105 of miscible gas-rich liquid separates the miscible gas-rich vapor phase 104 from the oil-rich liquid phase 106. As the miscible gas is injected into the reservoir the miscible gas bank 103 replenishes the miscible gas portion of the miscible gas-rich vapor phase 104 which in turn replenishes the miscible gas content of the intermediate zone 105 lost to the residual oil, connate water and oil-rich liquid phase 106. Oil from the virgin uncontacted region of the reservoir oil 107 is produced through production well 102. The tendency of viscous fingers of the miscible gas bank 103 to prematurely break through at production well 102 is restricted due to the even distribution of viscosities of the regions, thereby, affording a greater areal extent of the reservoir to be contacted and a more efficient recovery of oil from these contacted areas.

The benefits normally attributed to miscible gas displacement are also present in this improved process such as the effect of the lowering of the viscosity of the crude oil due to solution of the miscible gas, the miscible gas-crude oil mixture zone acting as a deterrent against gravity segregation of the fluids due to its intermediate density and the lower saturation of residual oil left behind after contacting with the miscible gas. In the present invention it should also be noted that the miscible gas will create its own bank of intermediate material and eliminate the problem of phase destruction. As more miscible gas is lost to residual oil and connate water the miscible gas-rich vapor phase trailing the intermediate buffer zone will replenish the intermediate zone and sustain its conformity.

Although all miscible gases will exhibit a three phase equilibrium with hydrocarbon crude oils, under the conditions of temperature and pressure found in oil reservoirs, carbon dioxide, ethane and combinations thereof are most effective and are especially useful with crude oils having a high intermediate hydrocarbon content. Therefore, it is another preferred embodiment of the present invention to apply carbon dioxide, ethane, or ethane-carbon dioxide mixtures to accomplish the objects of the present invention. The presence of other gases, for instance, methane, nitrogen and carbon monoxide, in contamination quantities up to 20-volume percent impurity will not limit the usefulness of the miscible gas in the present process.

Laboratory experimentation has provided a range of temperature of 90 to 110 degrees Fahrenheit and a pressure of 1,100 to 1,400 p.s.i.g. to be most favorable for the formation of the three-phase behavior with the carbon dioxide-high intermediate hydrocarbon crude oil systems. Experimentation with ethane has revealed the process to be applicable for the 90 to 110 degrees Fahrenheit temperature range and a pressure range from 800 to 1,300 p.s.i.g. with the high intermediate hydrocarbon crude oil systems. Therefore, the process is quite applicable for use in shallow reservoirs which exhibit low temperature and pressure. This phenomenon appears unobvious as compared to the existing belief that miscible gas drives should be conducted at elevated temperatures and pressures so as to assure complete miscibility of the miscible gas and reservoir fluid.

The above-disclosed process may be specifically modified for use in slug-type application. By this procedure a predetermined amount of miscible gas is introduced into the reservoir which is maintained within the physical conditions required to form the three-phase equilibrium system. This slug of miscible material is then driven through the reservoir by the subsequent injection of an inert fluid. Any inert fluid such as nitrogen, air, and flue gas may be used as the driving fluid. The problem commonly experienced in a slug process is that the slug diminishes in size and breaks up due to the radial spreading of the slug advancement. However, when employing the process of this invention, slug losses are reduced as the intermediate phase of miscible gas-rich liquid has the tendency to hold the slug intact and uniform. This mechanism aids in the oil recover so that a highly efficient contacting of the reservoir may be maintained.

The present invention is illustrated by the following example:

EXAMPLE

A crude oil obtained by the bottomhole sampling of a production well analyzed to be rich in intermediate hydrocarbons, having an average molecular weight of 110 was used as the reservoir oil. A 250 cc. high pressure windowed equilibrium cell, through which phase behavior could be studied visually, was charged with the crude oil. The system phase behavior was studied at 92 degrees Fahrenheit and over a range of 1,000 to 2,000 p.s.i.g. by the introduction and pressuring of the system with carbon dioxide. Three-phase behavior was observed from 1,100 to 1,400 p.s.i.g. The three phases were sampled and revealed the less-dense phase, which formed in the upper portion of the windowed cell, to be a vapor phase having carbon dioxide as its main constituent. The intermediate density phase formed in the central portion of the windowed cell was determined to be a liquid phase rich in carbon dioxide and intermediate hydrocarbon compounds while the most dense or lower phase formed within the cell was found to be a liquid oil phase saturated with carbon dioxide.

To determine the efficiency of the process a 42-foot long, 0.25-inch stainless steel tube was packed with sand resulting in a sand pack having a 35 percent void space. The sand-packed tube was charged with crude oil from the same bottomhole sample used in the aforemention equilibrium study, heated and held at a uniform temperature of 92 degrees Fahrenheit. Carbon dioxide was injected at 1,000 p.s.i.g. into the tube inlet and oil displaced until gas breakthrough at the production outlet of the sand-packed tube was experienced. The total pore volume of oil displaced was measured, the tube recharged with oil and the experimental procedure repeated as described at increments of 500 p.s.i.g. from 1,000 up to a pressure of 3,000 p.s.i.g. The upper curve of FIG. 2 depicts the results obtained. An identical procedure was then conducted utilizing methane, the principle component of natural gas, to determine the relative comparison of the present invention with a conventional miscible gas displacement process. The lower curve of FIG. 2 depicts the results of the methane displacement study.

It can be appreciated from a comparison of the two recovery curves shown in FIG. 2 that a miscible gas, such as carbon dioxide, exhibiting a three-phase system with a crude oil yields a superior oil recovery in its three-phase region than that obtained by a miscible gas which does not exhibit the three-phase system. Methane, for example, exhibits the typical behavior of a miscible gas which does not display a three-phase equilibrium system at normal reservoir conditions of temperature and pressure and has the normal increasing oil recovery with pressure due to increased solubility of the gas in the oil. This latter type of phenomenon is the result generally expressed in the art of miscible gas displacement. With a miscible gas displacement process of the present invention the ultimate recovery may be greatly increased through the use of lower injection and reservoir pressures than previously thought possible. Therefore, a miscible gas which exhibits a three-phase system with crude oil may yield a higher recovery of oil at a low reservoir pressure, for example, 2,000 p.s.i.g. than if the reservoir is maintained at a higher reservoir pressure, say 4,000 p.s.i.g. The present invention, therefore, provides a highly significant method for the recovery of oil from low-pressured reservoirs. The improved miscible displacement process is applicable to shallow reservoirs previously determined to be unsuitable for secondary miscible gas displacement. Recovery of oil from reservoirs abandoned after primary production or rejected for miscible gas injection are rendered suitable by this process so that the total oil recovery therefrom is enhanced.

The invention has been described herein with respect to particular embodiments and aspects thereof. It will be appreciated by those skilled in the art that various changes and modifications can be made, however, without departing from the scope of the appended claims.

Therefore, I claim:

1. In a miscible displacement process for the recovery of oil of the type wherein miscible gas is introduced into a subterranean oil reservoir under pressure so as to form a bank of gas which dissolves and renders mobile the oil contained therein and drives the contacted oil to a point where it is removed to the earth's surface, the improvement which comprises introducing carbon dioxide under conditions of pressure and temperature wherein the pressure of the reservoir is maintained from 1,100 to 1,400 p.s.i.g. and the reservoir temperature is in the range of 90° to 110° F. so that a three-phase equilibrium is formed between the carbon dioxide and the reservoir fluid which has a high intermediate hydrocarbon content, comprising a vapor phase rich in miscible gas being formed at the furthest extent of the leading front of the bank of the carbon dioxide injected, a second phase being a liquid phase rich in the carbon dioxide and exhibiting a density and viscosity intermediate to the two other phases and formed therebetween, and a third phase being a liquid phase rich in the components of the reservoir fluid and in contact therewith so that as further carbon dioxide is introduced into the reservoir, the three-phase region moves through the reservoir, thereby contacting virgin oil, dissolving therein, lowering its viscosity and rendering it more mobile.

2. The process of claim 1 further comprising:
   a. introducing an inert fluid after a bank of carbon dioxide has been formed; and
   b. driving the three-phase region and bank of carbon dioxide through the reservoir with the inert fluid.

3. In a miscible displacement process for the recovery of oil, of the type wherein miscible gas is introduced into a subterranean oil reservoir under pressure so as to form a bank of miscible gas which dissolves in and renders mobile the oil contained therein and drives the contacted oil to a point wherein it is removed to the earth's surface, the improvement which comprises introducing the miscible gas, consisting essentially of a gas selected from the group consisting of ethane and a mixture of ethane and carbon dioxide, under the conditions of pressure and temperature so that a three-phase equilibrium is formed between the miscible gas and the reservoir fluid, comprising a vapor phase rich in the miscible gas being formed at the furthest extent of the leading front of the bank of miscible gas injected, a second phase being a liquid phase rich in the miscible gas and exhibiting a density and viscosity intermediate to the two other phases and formed therebetween, and a third phase being a liquid phase rich in the components of the reservoir fluid and in contact therewith so that as further miscible gas is introduced into the reservoir, the three-phase region moves through the reservoir, thereby contacting virgin oil, dissolving therein, lowering its viscosity and rendering it more mobile.

4. The process of claim 3 in which the miscible gas is a mixture of carbon dioxide and ethane.

5. The process of claim 3 further comprising:
   a. introducing an inert fluid after a bank of miscible gas, has been formed; and
   b. driving the three-phase region and bank of miscible gas through the reservoir with the inert fluid.

6. The process of claim 5 in which the miscible gas is a mixture of carbon dioxide and ethane.

* * * * *